(12) United States Patent
Betts et al.

(10) Patent No.: US 7,760,746 B2
(45) Date of Patent: Jul. 20, 2010

(54) CASCADING CONFIGURATION USING ONE OR MORE CONFIGURATION TREES

(75) Inventors: Christopher Betts, Mount Dandenong (AU); Tony Rogers, Rowville (AU)

(73) Assignee: Computer Associates Think, Inc., Islandia, NY (US)

( * ) Notice: Subject to any disclaimer, the term of this patent is extended or adjusted under 35 U.S.C. 154(b) by 1632 days.

(21) Appl. No.: 10/999,693

(22) Filed: Nov. 30, 2004

(65) Prior Publication Data

US 2006/0130050 A1 Jun. 15, 2006

(51) Int. Cl.
*H04L 12/28* (2006.01)

(52) U.S. Cl. ........................................ 370/408; 709/220

(58) Field of Classification Search .................. None
See application file for complete search history.

(56) References Cited

U.S. PATENT DOCUMENTS

| | | | | |
|---|---|---|---|---|
| 5,875,327 A | | 2/1999 | Brandt et al. ............... 395/651 |
| 6,105,062 A | * | 8/2000 | Andrews et al. ............ 709/223 |
| 6,366,954 B1 | * | 4/2002 | Traversat et al. ........... 709/220 |
| 6,430,613 B1 | * | 8/2002 | Brunet et al. ............... 709/223 |
| 6,587,874 B1 | | 7/2003 | Golla et al. ................. 709/220 |
| 7,020,662 B2 | * | 3/2006 | Boreham et al. ......... 707/104.1 |
| 7,047,257 B2 | * | 5/2006 | Fletcher et al. ............. 707/201 |
| 7,401,070 B2 | * | 7/2008 | Kiji .............................. 707/3 |
| 7,433,304 B1 | * | 10/2008 | Galloway et al. ........... 370/229 |
| 2002/0091819 A1 | * | 7/2002 | Melchione et al. ......... 709/224 |
| 2003/0191757 A1 | * | 10/2003 | Ambrosini et al. ............ 707/3 |
| 2004/0225865 A1 | * | 11/2004 | Cox et al. .................... 712/34 |

OTHER PUBLICATIONS

Notification of Transmittal of the International Search Report and the Written Opinion of the International Searching Authority for International application No. PCT/US2005/040925, filed Nov. 11, 2005 (11 pages), Apr. 6, 2006.
Snyder, A. "*NC Configuration Using LDAP*", Jul 13, 1999, XP002224069 (11 pages), Jul. 1998.
Wahl, M., Critical Angle Inc., T Howes Netscape Communications Corp., Kille, S., Isode Limited M: "*Lightweight Directory Access Protocol* (v3)", IETF Standard, Internet Engineering Task Force, IETF, CH, XP015008035 (51 pages), Dec. 1997.

* cited by examiner

*Primary Examiner*—Phirin Sam
(74) *Attorney, Agent, or Firm*—Baker Botts L.L.P.

(57) ABSTRACT

A method for configuring a product includes locating one or more desired nodes from one or more configuration hierarchies of configuration nodes and determining a configuration based on the one or more desired nodes from the one or more configuration hierarchies of configuration nodes.

48 Claims, 6 Drawing Sheets

CASCADING CONFIGURATION USING ONE OR MORE CONFIGURATION TREES

BACKGROUND

1. Technical Field

The present disclosure relates to configuration and, more specifically, to configuration using one or more configuration trees.

2. Description of the Related Art

As computer systems become more common and more complex, enterprises utilize creative and efficient ways to manage computer systems. Additionally, with the wide assortment of threats facing computer system security and integrity, close management of computer systems has become indispensable. However, with the large and growing quantity of computers in use, enterprises may have difficulty closely managing all of the computer systems that are in use by the enterprise.

One aspect of computer management is the configuration of distributed products. An enterprise may often wish to deploy computer products, for example computer software packages, to one or more computer systems associated with the enterprise. For example, an enterprise may wish to install a computer program on dozens or hundreds of computer systems world-wide.

While methods for deploying software packages are currently in use, installation and/or management of these software packages often require configurations be provided that are specific for each computer system that the software package is installed onto. This is because different computer system platforms may have different needs during deployment. For example, deploying a computer program on a computer system running one operating system may require different configurations than deploying the same computer program on another computer system running another operating system.

One solution may be to adopt a generic "one-size-fits-all" default configuration to be used by all computer systems during product distribution. However, because an enterprise may have a large number of computer systems employing many different platforms, using a default configuration may not be an effective method for distributing products.

Another solution may be to use a custom configuration for each computer system within the enterprise. However, this solution may be very labor intensive and expensive as each computer system should be examined and a proper configuration custom developed. These disadvantages may persist even when a default configuration is used in conjunction with smaller custom modifications. This process may additionally require intrusive agent-based software delivery solutions that may be expensive, error prone and/or high maintenance.

Another solution may be to use one of several available configurations depending on the type of computer system and distributed product. However this solution may result in a rough granularity of configuration options as well as an "either/or" situation. For example, if one available configuration is for "manager's computers" and another is for "Pentium 4 computers" then a manager's computer system having a Pentium 4 may have to choose between one or the other configuration.

Management of configurations to be used during distribution of products is often implemented from a single server, for example a configuration server. Using a single server has several disadvantages. For example, multiple simultaneous distributions may create a bottleneck at the configuration server adding delay and cost to the delivery process. For example, relying on a single configuration server for enterprise-wide distributions may represent a potential for a single point of failure that may be unacceptable to many enterprises.

It is therefore desirable to have an efficient and effective system and method for configuring a large number of distributed products across many computer systems that is able to avoid bottleneck and a single point of failure.

SUMMARY

A method for configuring a product includes locating one or more desired nodes from one or more configuration hierarchies of configuration nodes and determining a configuration based on the one or more desired nodes from the one or more configuration hierarchies of configuration nodes.

A system for configuring a product includes a locating unit for locating one or more desired nodes from one or more configuration hierarchies of configuration nodes and a determining unit for determining a configuration based on the one or more desired nodes from the one or more configuration hierarchies of configuration nodes.

A computer system includes a processor and a program storage device readable by the computer system embodying a program of instructions executable by the processor to perform method steps for configuring a product. The method includes locating one or more desired nodes from one or more configuration hierarchies of configuration nodes and determining a configuration based on the one or more desired nodes from the one or more configuration hierarchies of configuration nodes.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure provide configurations for distributed products that are efficient, effective and reliable. According to some embodiments of the present disclosure, a hierarchy of configurations is provided such that a computer system (for example, a work station, a server or any other electronically configurable device) may receive proper configuration information by identifying a corresponding configuration node within the hierarchy of configurations and then applying the configurations, in hierarchical order, from the root configuration node down to the identified corresponding configuration node. The process of applying configurations, in hierarchical order, from the root configuration to the identified node configuration may be thought of as applying a set of configurations in a cascading pattern, as the hierarchical tree is traversed downwards from node to node.

Configurations associated with higher nodes of the hierarchy may contain more general configuration attributes while configurations associated with lower nodes of the hierarchy may contain more specific configuration attributes. As the hierarchy is traversed, elements of the applied configurations may conflict. For example, a higher node may define a configuration attribute with one value and then a lower node may define the same configuration attribute with a different value. Such conflicts may be resolved in favor of the most recently applied configuration and hence the configuration evolves from the general to the specific as the hierarchy is traversed.

By establishing the hierarchy of configurations, it is not necessary to define custom configurations for each individual computer system that is to have a distributed product configured. However, computer systems may still be able to receive specific configurations, where needed. Similarly, custom configurations need not be developed for computer systems that may require more general configurations.

The hierarchy of configurations may categorize configurations according to one or more specified groups. For example, the one or more specified groups may represent global, regional and/or individual configurations. Here, configurations may be categorized according to the category of computer system that is to receive the configuration information. For example, configurations may be categorized according to the location of the computer systems.

An example of configuration within a single hierarchy will now be described. In this example, a computerized weather station is part of a global network of monitoring stations. If the weather station is a buoy in Long Island Sound, for example, it may be part of a geographical hierarchy that goes 'All Stations'->'Northern Hemisphere'->'North America'->'East Coast'->'Long Island Sound'->'buoy #4'. Instructions to all stations can be modified by any more specific instructions to just 'North America'. For example, if configuration at the 'All Stations' level set reporting times of 'twice an hour' and 'measure temperature and wind speed', and configuration at the 'North America' level set reporting times to 'five times an hour', then the Long Island Sound buoy would receive the combined configuration of 'report five times an hour, measuring temperature and wind speed'.

Embodiments of the present disclosure may employ any number of configuration attributes. Configuration attributes include elements of a configuration that may be used to configure a distributed product on a particular computer system. Configuration attributes may establish the type of data that may be needed to configure a distributed product. For example, a configuration attribute may be "Path to Saved Documents."

Each configuration attribute may be assigned one or more corresponding values. Configuration attribute values may indicate the actual data that may be needed to configure a distributed product. For example, the configuration attribute "Path to Saved Documents" may have a value "C:\Saved Documents\."

Figure 1:
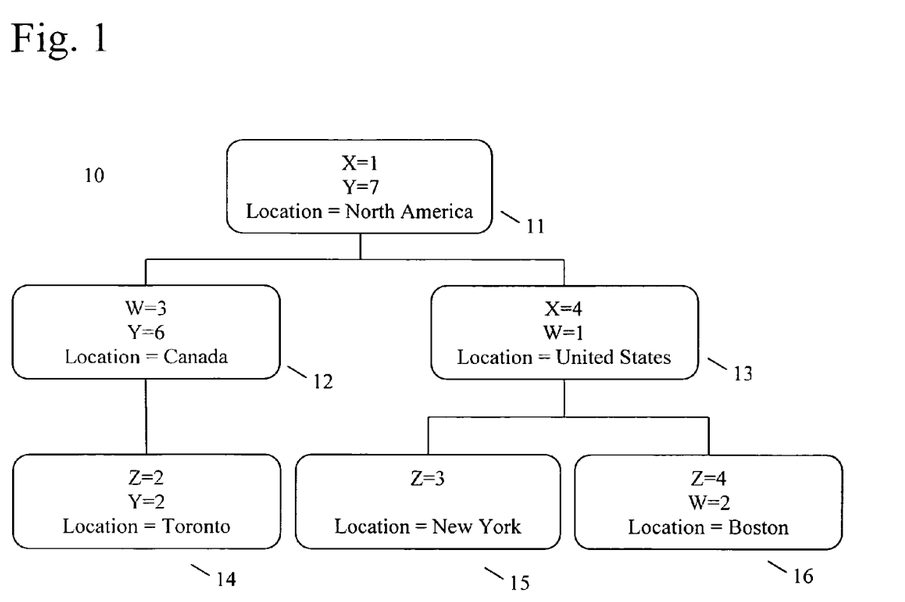
FIG. 1 shows a hierarchy of configuration nodes where the top configuration node 11 is the root configuration node.

FIG. 1 shows a hierarchy of configuration nodes 10 where the top configuration node 11 is the root configuration node. According to the example configuration hierarchy illustrated in FIG. 1, there are four possible configuration attributes: W, X, Y and Z. In this example, each configuration attribute may have one configuration value.

Each configuration node 11-16 may assign a value to zero or more configuration attributes. Configuration attributes may be defined as having zero or more corresponding configuration attribute values. For example, the root configuration node 11 assigns configuration attribute X a value of 1 and assigns configuration attribute Y a value of 7.

In addition to configuration attributes and configuration attribute values, each configuration node 11-16 may have zero or more search attributes. Each search attribute may then be assigned zero or more corresponding values. Search attributes and corresponding values may be used to identify a configuration node. For example, a search attribute may be "Location" to allow nodes to be identified by their location. For example, the root node 11 may be identified as having a location of "North America."

Nodes may be searched using search attributes and search attribute values. For example, the hierarchy 10 may be searched for a node having a location of "Toronto." Search attributes and search attribute values may be used to identify which node should be used for a given distributed product and computer system. For example, a computer system in Toronto may obtain the proper configuration for a distributed product from node 14.

A search may identify one or more matching nodes. After an appropriate node or nodes are identified for a given computer system and distributed product, the hierarchy 10 may be traversed to determine an appropriate set of configuration attributes and configuration attribute values for the given computer system to use with the given distributed product.

When traversing the configuration hierarchy, the root node may be considered first. In considering the root node, configuration attributes and their corresponding values may be applied to a list of configurations for the given computer system and distributed product. Then the node immediately below the root node that is part of the lineage of the identified appropriate node may be considered. Likewise any configuration attributes and their corresponding values from this node are applied to the list of configurations. If a configuration attribute is assigned one value for one node and then assigned another value for another node, the value of the most recently considered node is used. For example, if the root node assigns a configuration attribute "Path to Saved Documents" a value of "C:\Saved Documents\" and then, in considering the node immediately below the root node that is part of the lineage of the identified appropriate node, the configuration attribute "Path to Saved Documents" is assigned a value of "C:\My Documents\" then the value "C:\My Documents\" replaces the value "C:\Saved Documents\" in the list of configurations.

Subsequently, the next lower node that is part of the lineage of the desired configuration node is considered and configuration attribute values are similarly recorded in the list of configurations until the next lower node that is part of the lineage of the desired configuration node is the desired configuration node itself. After the attribute values from the desired configuration node have been recorded, the list of configurations may be complete.

The completed list of configurations may then be used by the given computer system for the distributed product.

For example, a search for location="Boston" may return node 16 as a desired configuration node. The root configuration node 11 may be considered first. A configuration attribute X and a corresponding value of 1 and a configuration attribute Y and a corresponding value of 7 are added to the list of configurations. Next, node 13 may be considered. Here the value for the configuration attribute X may be replaced with a 4 and a configuration attribute W and a corresponding value of 1 may be added to the list of configurations. Finally node 16 may be considered. A configuration attribute Z and a corresponding value of 4 may be added to the list of configurations and the value for the configuration attribute W may be replaced with a 2.

Where more than one appropriate node has been identified during the search, each node may be traversed, for example according to the order in which they were found or according to a pre-determined order. Where one of the nodes found is part of the lineage of another one of the nodes found, i.e. an ancestor node and a descendant node are found, the ancestor node may be disregarded as it may be considered when traversing for the descendant node.

Figure 2:
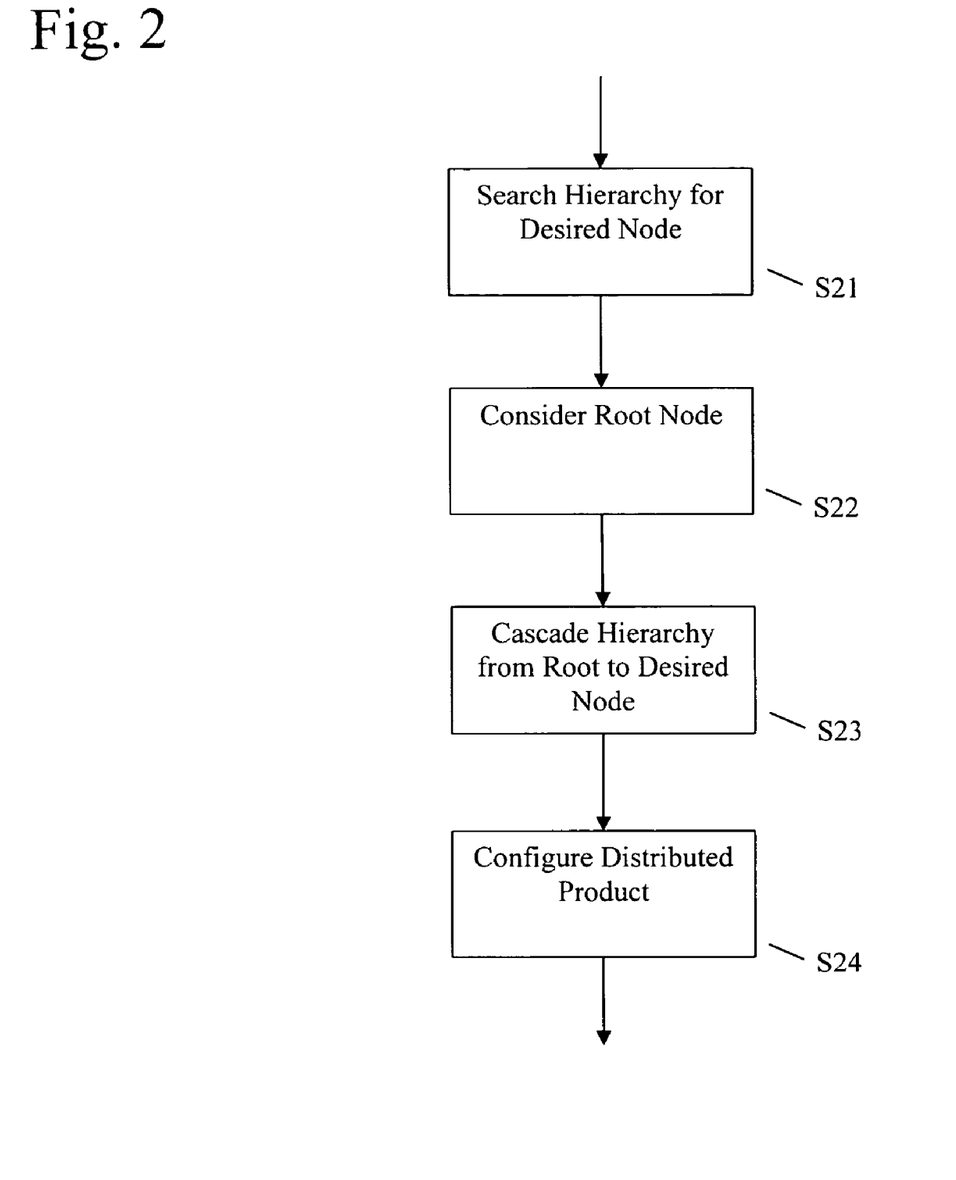
FIG. 2 is a flow chart illustrating a method for determining configurations for a distributed product according to an embodiment of the present disclosure.

FIG. 2 is a flow chart illustrating a method for determining configurations for a distributed product according to an embodiment of the present disclosure. First a hierarchy of configuration may be searched using one or more search attributes to find a desired node (Step S21). Next, the root node may be considered (Step S22). In considering a node, configuration attributes and corresponding values may be copied from the considered node to a list of configurations. Where a given configuration attribute has an existing value on the list of configurations, the value corresponding to the most recently considered node may replace previous values. Next, the hierarchy is traversed from the root node to the desired node (Step S23). In traversing the hierarchy, nodes are considered from the root node to the desired node along the lineage of the desired node with configuration attributes and their respective values added to a list of configurations. Finally, the list of configurations may be used to configure the distributed product for the particular computer system (Step S24).

Embodiments of the present disclosure are not limited to utilizing a single configuration hierarchy. Any number of hierarchies may be utilized. For example, a first hierarchy may be arranged according to location while a second hierarchy may be arranged according to type. Utilizing multiple hierarchies may be useful, for example, when some configuration elements are dependent on one arrangement, for example location, and other configuration elements are dependent on another arrangement, for example type. For example, a configuration attribute "Path to Saved Documents" may have a value of "C:\My Documents\" for all computer systems of a first type and "C:\Saved Documents\" for all computer systems of a second type. Here a hierarchy according to type may be beneficial. In the same example, a configuration attribute "Language" may have a value of "English" for all computer systems of one location and a value of "Spanish" for all computer systems of another location. Here a hierarchy according to location may be beneficial as well.

The following is an example using the above-mentioned weather station example, where it might be desirable to change the configuration of all weather stations simultaneously based on multiple attributes. For example, those that are on high bandwidth connections, all those that are within 100 km of a newly emerging hurricane, and all those that are in North America. This will require three independent hierarchies; a bandwidth hierarchy that categorizes all stations by bandwidth speed, a dynamic hierarchy that classifies stations by current weather conditions, and the hierarchy described above that classifies stations by geography. The different configuration requirements might be, for example, for stations on high bandwidth connections to take readings once every ten seconds, for those close to a hurricane to take readings once a minute, and for all North American stations to take readings five times an hour. Assuming the search order is 'Geography first, weather conditions second, bandwidth third', a weather station that was on a high bandwidth, North American connection in a hurricane would end up taking readings every ten seconds, as the 'bandwidth' hierarchy is consulted last.

Where multiple hierarchies are used, a computer system may utilize configuration nodes from one or more hierarchies. For example, it may be beneficial to conduct a first search from a first hierarchy resulting in a first desired node and a second search from a second hierarchy resulting in a second desired node. As any number of hierarchies may be used, any number of searches may be beneficial. After desired nodes have been identified, one or more hierarchies may be traversed as described above. For a given computer system and a given distributed product, a single list of configurations may be used regardless of the number of hierarchies searched. Different hierarchies may utilize the same set of configuration attributes, they may use different sets of configuration attributes, or they may use overlapping sets of configuration attributes. When traversing multiple hierarchies, if a configuration attribute is assigned one value during the traversal of one hierarchy and that same attribute is assigned another value during the traversal of another hierarchy, the most recently considered configuration node will override values established by previously considered configuration nodes. Therefore, the order in which hierarchies are traversed may have significance. The order may be pre-determined by a priority list and/or the order may be determined by the particular computer system and/or distributed product being used.

Figure 3:
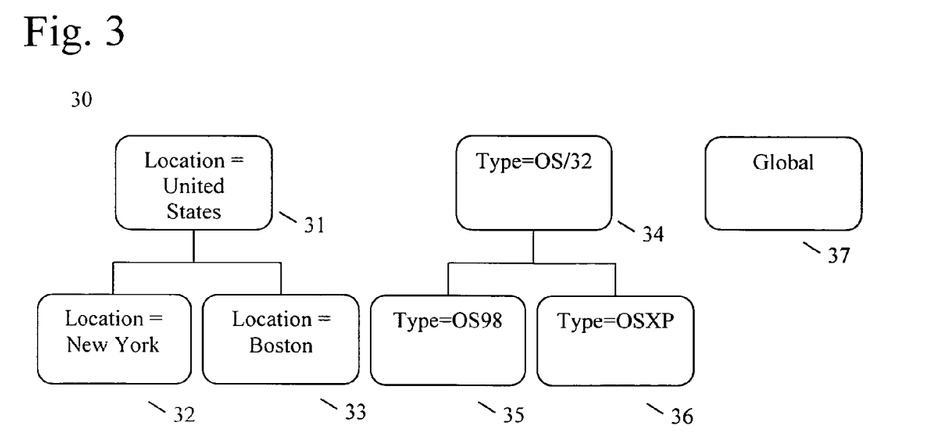
FIG. 3 is a block diagram showing multiple hierarchies of configuration nodes according to an embodiment of the present disclosure.
Figure 4:
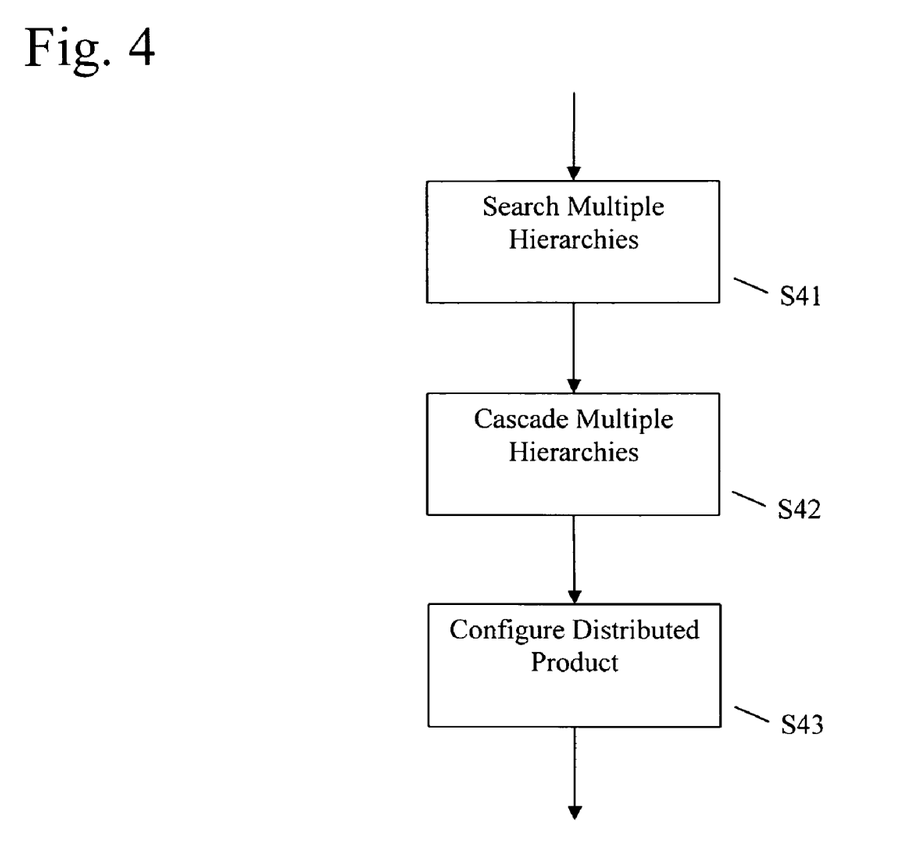
FIG. 4 is a flow chart illustrating a method for determining configurations for a distributed product utilizing multiple configuration hierarchies according to an embodiment of the present disclosure.

FIG. 3 is a block diagram showing multiple hierarchies of configuration nodes according to an embodiment of the present disclosure. FIG. 4 is a flow chart illustrating a method for determining configurations for a distributed product utilizing multiple configuration hierarchies according to an embodiment of the present disclosure. An embodiment of the present disclosure is described below with respect to FIG. 3 and FIG. 4.

Here configuration may be determined using three hierarchies. The first hierarchy 31-33 is organized according to location. Node 31 is the root node for the first hierarchy 31-33. The second hierarchy 34-36 is organized according to type. Node 34 is the root node for the second hierarchy 34-36. The third hierarchy 37 is a single node of global defaults 37.

A pre-determined search order may be used to search each of the hierarchies (Step S41). The search order may be the order in which the distributed product should be considered. For example, it may be beneficial to first configure the distributed product according to global defaults, then configure the distributed product based on type and then configure the distributed product based on location.

Accordingly, the third hierarchy 37 may be searched first. Where one of the multiple hierarchies is a node of global defaults, it may be beneficial to search that hierarchy first. Here the desired node may be the global node 37. Next the second hierarchy 34-36 may be searched. For example, the second hierarchy 34-36 may be searched for a type "OSXP."

Here the desired node may be node 36. Next the first hierarchy 31-33 may be searched. For example, the first hierarchy 31-33 may be searched for a location "New York." Here the desired node may be node 32.

In traversing the multiple hierarchies (Step S42), the individual hierarchies may be traversed according to the order in which the distributed product should be configured. For each hierarchy, the hierarchy is traversed from its root to its desired node. In this example, the order in which nodes should be considered is: 37, 34, 36, 31 and 32. In so doing, a single list of configurations may be generated. The list of configurations may then be used to configure the distributed product for the particular computer system (Step S43).

When a distributed product is distributed to computer systems, each computer system may be able to obtain appropriate configuration information by referring to one or more hierarchies as described above. The one or more hierarchies that may be used to obtain appropriate configuration information may be stored locally on the computer system. For example, the one or more hierarchies may be distributed to the computer systems along with the distributed product. Alternatively, the one or more hierarchies may be accessible to the computer systems over a computer network, for example the internet. According to an embodiment of the present disclosure, the one or more hierarchies may be stored on a central server that is accessible to the computer systems desiring configuration for a distributed product. For example, the central server may be a file server that is accessible over a local area network, for example and intranet.

According to another embodiment of the present disclosure, the one or more hierarchies may be made available via a directory. Directories are specialized databases that are primarily used for allowing a large number of users to quickly look up information. Directories may be distributed, utilizing multiple directory servers, either spread out over some geographical area, for example world-wide, or kept together, for example as a bank of servers. By distributing directory service over multiple servers, service may be scalable, allowing for the handling of additional capacity by adding additional servers. Moreover, by distributing directory service over multiple servers, service may be continued even in the event that one or more servers are not functioning properly.

LDAP, or the Lightweight Directory Access Protocol, is a protocol for quickly and easily accessing directory services. LDAP servers communicate using TCP/IP transfer services or similar transfer services making LDAP servers well suited for use over the internet or private company intranets. LDAP directories may be utilized to implement the one or more hierarchies according to embodiments of the present disclosure.

X.500 is a common set of standards pertaining to directories. X.400 directories may be utilized to implement the one or more hierarchies according to embodiments of the present disclosure.

By making the one or more hierarchies available via a directory, slowdowns in product distribution due to bottlenecks at the server hosting the one or more hierarchies may be prevented by adding additional directory service servers. Moreover, by utilizing distributed directories, configuration service need not be susceptible to a single point of failure.

According to one embodiment of the present disclosure, configuration hierarchies may be implemented by creating a directory entry for each hierarchy node. Search attributes, search attribute values, configuration attributers and configuration attribute values may then be stored as directory entry attributes and directory entry attribute values.

Identifying nodes may then be implemented using directory search queries. The results to such a query may return a distinguished name of the directory entry representing the desired node. The distinguished name may implicitly contain the complete path of the hierarchy lineage from the desired node entry to the root node entry. This information may then be used to traverse the hierarchy.

Figure 5:
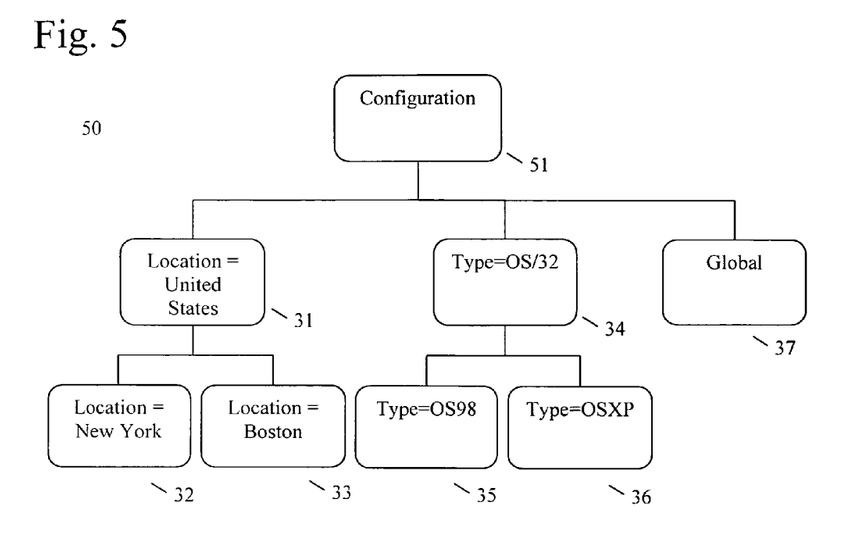
FIG. 5 is a block diagram showing the multiple hierarchies of configuration nodes shown in FIG. 3 joined as a single hierarchy according to an embodiment of the present disclosure.

According to one embodiment of the present disclosure, multiple hierarchies may be joined to form a single hierarchy to facilitate implementation of the multiple hierarchies using a directory. This may be accomplished by creating a root node under which all of the multiple hierarchies are added. FIG. 5 is a block diagram showing the multiple hierarchies of configuration nodes shown in FIG. 3 joined as a single hierarchy according to an embodiment of the present disclosure. Here, each of the multiple hierarchies 31-33, 34-36, and 37 are combined as a single hierarchy 50 under a root node 51. The root node 51 may be included in traversing as described above, however the root node 51 need not contain configuration attributes or configuration attribute values so considering the root node 51 need not affect a configuration list. For example, the root node 51 may contain general system information.

Embodiments of the present disclosure may be represented to a user in a reasonably user friendly fashion. Rather than displaying the entire configuration hierarchy at once, a relevant subset of the configuration hierarchy may be displayed. For example, a subset relevant to a particular distributed product being configured may be displayed.

Figure 6:
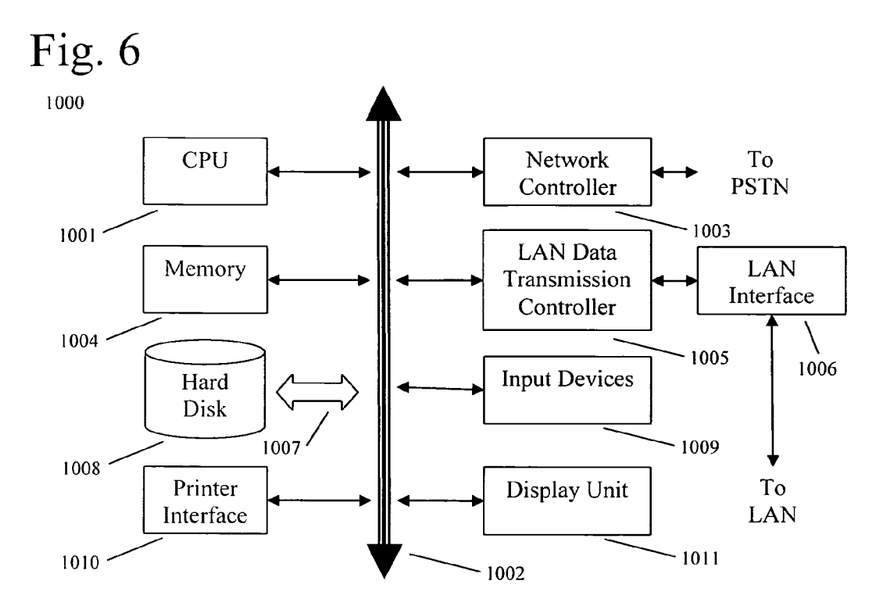
FIG. 6 is a block diagram showing an example of a computer system capable of implementing the method and apparatus according to embodiments of the present disclosure.

FIG. 6 is a block diagram showing an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for configuring a software product comprising:
    locating one or more desired nodes from one or more configuration hierarchies of configuration nodes, the locating comprising considering one or more search attributes that are associated with one or more of the configuration nodes; and
    determining, using one or more computer systems, a configuration of a software product based on the one or more desired nodes from the one or more configuration hierarchies of configuration nodes;

wherein the determining a configuration of a software product based on the one or more desired nodes from the one or more configuration hierarchies of configuration nodes comprises:

considering a root node of a first hierarchy of the one or more configuration hierarchies;

considering one or more subsequent nodes that are descendants of the root node and ancestors of the desired node; and considering the desired node; and wherein considering a node comprises adding configuration attributes and corresponding configuration attribute values to a configuration list of configuration attributes and corresponding attribute values such that the most recently added configuration attribute value for a corresponding configuration attribute supersedes previously added configuration attribute values for the corresponding configuration attribute.

2. The method of claim 1, wherein the software product is a distributed software product.

3. The method of claim 1, wherein the one or more configuration hierarchies are arranged according to one or more groupings.

4. The method of claim 1, wherein one of the more configuration hierarchies is arranged according to type.

5. The method of claim 1, wherein one of the more or more configuration hierarchies is arranged according to location.

6. The method of claim 1, wherein one of the one or more configuration hierarchies is a node of one or more default configurations.

7. The method of claim 1, wherein the determining of the configuration based on the one or more desired nodes comprises collecting one or more configuration attributes that are associated with one or more of the configuration nodes.

8. The method of claim 1, wherein the considering of the one or more subsequent nodes comprising considering the one or more subsequent nodes according to a hierarchical order, from highest to lowest, as defined by the one or more hierarchies.

9. The method of claim 1, further comprising configuring the software product based on the list of configuration attributes and corresponding attribute values.

10. The method of claim 1, wherein the one or more configuration hierarchies are implemented on a directory and the locating of the one or more desired nodes from one or more configuration hierarchies comprises conducting a directory search for the one or more desired nodes.

11. The method according to claim 10, wherein the directory is accessed using LDAP.

12. The method according to claim 10, wherein the directory is an X.500 directory.

13. The method according to claim 10, wherein the directory is a distributed directory comprising a plurality of directory servers.

14. The method according to claim 10, wherein each node of the one or more hierarchies is a directory entry.

15. The method of claim 1, wherein the locating of the one or more desired nodes from the one or more configuration hierarchies comprises conducting a search of the one or more configuration hierarchies based on one or more search attributes associated with one or more nodes of the one or more configuration hierarchies.

16. The method of claim 1, further comprising configuring the software product based on the determined configuration.

17. A system for configuring a software product, comprising:

a locating unit for locating one or more desired nodes from one or more configuration hierarchies of configuration nodes, the locating unit comprising a considering unit for considering one or more search attributes that are associated with one or more of the configuration nodes; and a determining unit for determining a configuration based on the one or more desired nodes from the one of more configuration hierarchies of configuration nodes;

wherein the determining unit comprises:

a root-node considering unit for considering a root node of a first hierarchy of the one or more configuration hierarchies;

a subsequent-node considering unit for considering one or more subsequent nodes that are descendants of the root node and ancestors of the desired node; and a desired node considering unit for considering the desired node; and wherein considering a node comprises adding configuration attributes and corresponding configuration attribute values to a configuration list of configuration attributes and corresponding attribute values such that the most recently added configuration attribute value for a corresponding configuration attribute supersedes previously added configuration attribute values for the corresponding configuration attribute.

18. The system of claim 17, wherein the software product is a distributed software product.

19. The system of claim 17, wherein the one or more configuration hierarchies are arranged according to one or more groupings.

20. The system of claim 17, wherein one of the one or more configuration hierarchies is arranged according to type.

21. The system of claim 17, wherein one of the one or more configuration hierarchies is arranged according to location.

22. The system of claim 17, wherein one of the one or more configuration hierarchies is a node of one or more default configurations.

23. The system of claim 17, wherein the determining unit comprises a collecting unit for collecting one or more configuration attributes that are associated with one or more of the configuration nodes.

24. The system of claim 17, wherein the subsequent-node considering unit comprising a hierarchical-considering unit for considering the one or more subsequent nodes according to the hierarchical order, from highest to lowest, as defined by the one or more hierarchies.

25. The system of claim 17, further comprising a configuring unit for configuring the software product based on the list of configuration attributes and corresponding attribute values.

26. The system of claim 17, wherein the one or more configuration hierarchies are implemented on a directory and the locating of the one or more desired nodes from one or more configuration hierarchies comprises conducting a directory search for the one or more desired nodes.

27. The system according to claim 26, wherein the directory is accessed using LDAP.

28. The system according to claim 26, wherein the directory is an X.500 directory.

29. The system according to claim 26, wherein the directory is a distributed directory comprising a plurality of directory servers.

30. The system according to claim 26, wherein each node of the one or more hierarchies is a directory entry.

31. The system of claim 17, wherein the locating unit comprises a searching unit for conducting a search of the one or more configuration hierarchies based on one or more search attributes associated with one or more nodes of the one or more configuration hierarchies.

32. The system of claim 17, further comprising a configuring unit for configuring the software product based on the determined configuration.

33. A computer system comprising:
a processor; and
a program storage device readable by the computer system, embodying a program of instructions executable by the processor to perform method steps for configuring a software product, the method comprising:
locating one or more desired nodes from one or more configuration hierarchies of configuration nodes, the locating comprising considering one or more search attributes that are associated with one or more of the configuration nodes; and
determining a configuration based on the one or more desired nodes from the one or more configuration hierarchies of configuration nodes;
wherein the determining a configuration based on the one or more desired nodes from the one or more configuration hierarchies of the of configuration nodes comprises:
considering a root node of a first hierarchy of the one or more configuration hierarchies:
considering one or more subsequent nodes that are descendents of the root node and ancestors of the desired node; and
considering the desired node; and
wherein considering a node comprises adding configuration attributes and corresponding configuration attribute values to a configuration list of configuration attributes and corresponding attribute values such that the most recently added configuration attribute value for a corresponding configuration attribute supersedes previously added configuration attribute values for the corresponding configuration attribute.

34. The computer system of claim 33, wherein the software product is a distributed software product.

35. The computer system of claim 33, wherein the one or more configuration hierarchies are arranged according to one or more groupings.

36. The computer system of claim 33, wherein one of the one or more configuration hierarchies is arranged according to type.

37. The computer system of claim 33, wherein one of the one or more configuration hierarchies is arranged to location.

38. The computer system of claim 33, wherein one of the one or more configuration hierarchies is a node of one or more default configurations.

39. The computer system of claim 33, wherein the determining of the configuration based on the one or more desired nodes comprises collecting one or more configuration attributes that are associated with one or more of the configuration nodes.

40. The computer system of claim 33, wherein the considering of the one or more subsequent nodes comprising considering the one or more subsequent nodes according to a hierarchical order, from highest to lowest, as defined by the one or more hierarchies.

41. The computer system of claim 33, further comprising configuring the software product based on the list of configuration attributes and corresponding attribute values.

42. The computer system of claim 33, wherein the one or more configuration hierarchies are implemented on a directory and the locating of the one or more desired nodes from one or more configuration hierarchies comprises conducting a directory search for the one or more desired nodes.

43. The computer system according to claim 42, wherein the directory is accessed using LDAP.

44. The computer system according to claim 42, wherein the directory is an X.500 directory.

45. The computer system according to claim 42, wherein the directory is a distributed directory comprising a plurality of directory servers.

46. The computer system according to claim 42, wherein each node of the one or more hierarchies is a directory entry.

47. The computer system of claim 33, wherein the locating of the one or more desired nodes from the one or more configuration hierarchies comprises conducting a search of the one or more configuration hierarchies based on one or more search attributes associated with one or more nodes of the one or more configuration hierarchies.

48. The computer system of claim 33, further comprising configuring the software product based on the determined configuration.

* * * * *